(12) United States Patent
Maki et al.

(10) Patent No.: US 11,880,194 B2
(45) Date of Patent: Jan. 23, 2024

(54) CONTROL DEVICE, LOGGING METHOD, AND RECORDING MEDIUM HAVING PROGRAM RECORDED THEREON

(71) Applicant: OMRON CORPORATION, Kyoto (JP)

(72) Inventors: Noriyuki Maki, Kyoto (JP); Jintaro Deki, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 17/730,822

(22) Filed: Apr. 27, 2022

(65) Prior Publication Data

US 2022/0374005 A1   Nov. 24, 2022

(30) Foreign Application Priority Data

May 24, 2021   (JP) .................................. 2021-087099

(51) Int. Cl.
G05B 23/02        (2006.01)
G05B 19/418       (2006.01)

(52) U.S. Cl.
CPC ..... G05B 23/0264 (2013.01); G05B 19/4184 (2013.01); G05B 19/4185 (2013.01)

(58) Field of Classification Search
CPC ............ G05B 23/0264; G05B 19/4184; G05B 19/4185; G05B 2219/14055; Y02P 90/02
See application file for complete search history.

(56) References Cited

U.S. PATENT DOCUMENTS

| 7,606,890 B1* | 10/2009 | Baier ...................... H04L 41/12 709/224 |
| 2003/0023340 A1 | 1/2003 | Kitamoto et al. |
| 2011/0026407 A1 | 2/2011 | Yamada et al. |
| 2019/0079485 A1* | 3/2019 | Hamaguchi .............. G05B 9/03 |
| 2020/0310364 A1* | 10/2020 | Asai ................... G05B 19/4185 |

FOREIGN PATENT DOCUMENTS

| EP | 3 101 547 A1 | 12/2016 |
| EP | 3 355 143 A1 | 8/2018 |
| JP | 2011-035664 A | 2/2011 |

OTHER PUBLICATIONS

Extended European Search Report dated Oct. 19, 2022 in European Application No. 22169952.3.

* cited by examiner

*Primary Examiner* — Mischita L Henson
(74) *Attorney, Agent, or Firm* — Sughrue Mion, PLLC

(57) ABSTRACT

A control device performs logging of information related to communication with an instrument and logging of information related to control of the logging operation. The control device includes: a first connector that connects a first network to which a control target belongs; a second connector that connects a second network to which an external instrument belongs; a control arithmetic unit that executes control arithmetic processing using data related to the control target, a communication unit that exchanges the data with the external instrument by secure communication through the second network; a first logging unit that logs information related to the secure communication performed by the communication unit; and a second logging unit that logs information related to control of a logging operation of the first logging unit.

12 Claims, 15 Drawing Sheets

FIG.8

| | 801 | 802 | 803 | 804 | 805 |
|---|---|---|---|---|---|
| | CATEGORY | LOG CODE (DECIMAL) | LOG NAME | MEANING | DETAILED INFORMATION |
| 800 — | INFO | 1000 | Parameter | TLS SESSION PARAMETERS HOST, PORT | HOST: HOST NAME OF CONNECTION DESTINATION OR IP ADDRESS PORT: CONNECTION DESTINATION PORT NUMBER |
| | | 1001 | Parameter | TLS SESSION PARAMETER CAFile | FILE NAME OF SERVER CERTIFICATE WITH CA SIGNATURE |
| | | 1002 | Parameter | TLS SESSION PARAMETER CERT | CERT: FILE NAME OF CLIENT CERTIFICATE |
| | | 1003 | Parameter | TLS SESSION PARAMETER KEY | KEY: FILE NAME OF CLIENT SECRET KEY |
| | | 1010 | Established | TLS SESSION ESTABLISHMENT | NOTHING |
| | | 1011 | Disconnect | TLS SESSION END | NOTHING |
| 810 — | ERROR | 5000 | SessionFail | TLS SESSION ERROR | ERROR CAUSED IN LIBRARY OF Open SSL IS RECORDED. FUNCTION NAME OF Open SSL ERROR CODE OF Open SSL CHARACTER STRING CORRESPONDING TO ERROR CODE OF Open SSL IS OBTAINED. |
| | | 5001 | Timeout | TIMEOUT IN SECURE SOCKET COMMUNICATION | |
| | | 5002 | CommError | COMMUNICATION ERROR | FILE NAME OF SOURCE CODE IN WHICH ERROR IS CAUSED LINE NUMBER IN WHICH ERROR IS CAUSED |
| | | 5101 | SettingError | SETTING ini FILE ABNORMALITY | SECTION, ENTRY, SETTING VALUE IN WHICH ERROR IS DETECTED ARE RECORDED |

FIG.9

| No. | EVENT TYPE | RECORDED ITEM | EVENT CATEGORY | EVENT CODE | IMPORTANCE | IMPORTANCE CHANGE |
|---|---|---|---|---|---|---|
| 1 | START OR STOP OF SECURE COMMUNICATION LOG | – START OR STOP OF SECURE COMMUNICATION LOG | SYSTEM | 940D0000Hex | GENERAL INFORMATION | NOTHING |
| 2 | FAILURE OF SECURE COMMUNICATION LOG SAVING | – RECORDING OF SECURE COMMUNICATION LOG IS FAILED | SYSTEM | 940E0000Hex | MONITORING INFORMATION | NOTHING |
| 3 | ACCESS TO SECURE SOCKET SETTING FILE (FROM TOOL) | – ACCESS CONTENT (READING/ WRITING/DELETION)<br>– INFORMATION ABOUT ACCESS TARGET (SECURE COMMUNICATION LOG/ SESSION ID) | ACCESS | 940F0000Hex | GENERAL INFORMATION | NOTHING |

FIG.10

| OPTION | SETTING VALUE | DESCRIPTION |
|---|---|---|
| disable | 0 | SECURE SOCKET COMMUNICATION LOG INVALID |
| enable | 1 | SECURE SOCKET COMMUNICATION LOG VALID |
| — | — | — |

FIG.12

| 154: DATE AND TIME | 131: EVENT TYPE | 132: ITEM TO BE RECORDED | 133: EVENT CATEGORY | 134: EVENT CODE | 135: IMPORTANCE | 136: IMPORTANCE CHANGE |
|---|---|---|---|---|---|---|

FIG.15

```
...
    Frame 9: 78 bytes on wire (624 bits), 78 bytes captured (624 bits) on interface
    ¥Device¥NPF_{B0D2B078-4685-4726-9D1B-068B40170109}, id 0
    Ethernet II,. . .
    ...
    Frame 13: 366 bytes on wire (2928 bits), 366 bytes captured (2928 bits) on
    interface ¥Device¥NPF_{B0D2B078-4685-4726-9D1B-068B40170109}, id 0
    Ethernet II,
    ...
    Frame 24:
      0000  08 00 27 d1 7f 57 00 00 0a b6 2f 69 08 00 45 00   ..'..W..../i..E.
      0010  00 6d 03 c6 40 00 40 06 c0 77 c0 a8 fa 01 c0 a8   .m..@.@..w......
      0020  fa fa ff fa 01 bb 23 a1 df 52 7f e4 ff 6a 80 18   ......#..R...j..
      0030  83 2c 65 8b 00 00 01 01 08 0a 00 00 00 00 02 96   .,e.............
241   0040  f6 2d 17 03 03 00 34 12 8d 02 50 b1 16 b8 9f fa   .-....4...P.....
      0050  88 54 a3 a1 6f 11 01 22 18 ef a3 d4 79 37 a3 41   .T..o.."....y7.A
      0060  6c 1c 73 e7 6a fd 2e 6e 28 ff 8d ee b0 6d 0c 59   l.s.j.n(.....m.Y
      0070  0e 4d 70 bb 45 f0 8b 78 13 41 f2                  .Mp.E..x.A.
    ...
    Frame 32: 97 bytes on wire (776 bits), 97 bytes captured (776 bits) on interface
    ¥Device¥NPF_{B0D2B078-4685-4726-9D1B-068B40170109}, id 0
    Ethernet II,...
    Frame 48: 66 bytes on wire (528 bits), 66 bytes captured (528 bits) on interface
    ¥Device¥NPF_{B0D2B078-4685-4726-9D1B-068B40170109}, id 0
    Ethernet II,...
    ...
```

CONTROL DEVICE, LOGGING METHOD, AND RECORDING MEDIUM HAVING PROGRAM RECORDED THEREON

BACKGROUND OF THE INVENTION

Field of the Invention

The present disclosure relates to a control device that controls a target, a logging method, and a program, and more particularly relates to the control device that manages a communication log, the logging method, and a recording medium in which the program is recorded.

Description of the Background Art

In a factory automation (FA) manufacturing site, a control device such as a programmable logic controller (PLC) connected to a network has a function of controlling a target such as a production facility and an instrument and a communication function of exchanging data related to control with an external instrument including another control device through the network. The control device controls the target using the data exchanged with the external instrument.

For example, Japanese Patent Laying-Open No. 2011-35664 discloses a function of monitoring data communicated with the instrument through the network by an FA controller connected to the network. In Japanese Patent Laying-Open No. 2011-35664, the FA controller determines presence or absence of an abnormality of the network, monitors the data communicated with the instrument connected to the network, and holds the data monitored before the abnormality in a ring buffer when the abnormality is detected.

SUMMARY OF THE INVENTION

In order to safely use a facility and a machine used at a manufacturing site, it is desirable to manage security of a network that exchanges data with an external instrument. In such security management, information related to communication between a control device and an external instrument that are connected to the network is logged, and information subjected to logging processing is analyzed. In order to more accurately support the analysis, there is a demand acquiring information related to control of the logging operation tracing the logging operation as well as the processing for logging the information related to the communication. In this regard, Japanese Patent Laying-Open No. 2011-35664 only monitors data communicated with the instrument connected to the network and holds the data in a ring buffer, but does not propose a configuration in which information related to control of a monitoring operation is acquired.

An object of the present disclosure is to provide an environment in which the logging of the information related to the communication between the control device and the external instrument that are connected to the network and the logging of the information related to the control of the logging operation can be performed.

A control device for factory automation (FA) according to an example of the present disclosure includes: a first connector that connects a first network to which a control target belongs, a second connector that connects a second network to which an external instrument belongs, a control arithmetic unit that executes control arithmetic processing using data related to the control target; a communication unit that exchanges the data with the external instrument by secure communication through the second network; a first logging unit that logs information related to the secure communication performed by the communication unit; and a second logging unit that logs information related to control of a logging operation of the first logging unit.

According to this disclosure, the logging of the information related to the secure communication between the control device and the external instrument that are connected to the network and the logging of the information related to the control of the logging operation can be performed.

In the above disclosure, the control device further includes a storage medium interface to which an external storage medium is detachably attached. The first logging unit stores the information related to the secure communication in the external storage medium attached to the storage medium interface.

According to this disclosure, the information related to the secure communication can be logged by the external storage medium attached to the storage medium interface, and the control device can provide the information of the external storage medium for analysis without interrupting the control operation.

In the above disclosure, the second logging unit stores information related to the control of the logging operation in a storage medium different from the external storage medium.

According to this disclosure, the information related to the control can be logged in the storage medium different from the external storage medium, so that the information related to the control can be logged regardless of the state of the external storage medium.

In the above disclosure, the first logging unit logs the information related to the secure communication except for the data related to the control exchanged through the secure communication.

According to this disclosure, from the information logged as the information related to the secure communication, the data related to the control exchanged through the secure communication, namely, the encrypted data unsuitable for the information of the analysis target can be excluded.

In the above disclosure, the information related to the secure communication includes information about an error caused in the secure communication.

According to this disclosure, the error caused in the secure communication can be included as the information related to the logged secure communication.

In the above disclosure, the information related to the secure communication includes a condition establishing the secure communication through the second network.

According to this disclosure, the condition used for establishing the secure communication can be included as the information related to the logged secure communication.

In this disclosure, the information related to the secure communication includes information related to connection establishment of the secure communication through the second network.

According to this disclosure, the information related to the secure communication can include the information related to the connection establishment in the secure communication.

In the above disclosure, the information related to the secure communication includes information related to session establishment after the connection establishment.

According to this disclosure, the information related to the secure communication can include the information related to the session establishment performed after the connection establishment.

In the above disclosure, the information related to the control of the logging operation includes at least one of a start of the logging operation, a stop of the logging operation, a failure of the logging operation, and a setting related to the logging operation.

According to this disclosure, at least one of the start of the logging operation, the stop of the logging operation, the failure of the logging operation, and the setting related to the logging operation can be logged as the information related to the control of the logging operation.

In the above disclosure, the setting related to the logging operation includes a setting enabling or disabling the logging operation.

According to the above disclosure, the setting enabling or disabling the logging operation can be included as the information related to the control of the logging operation.

In the above disclosure, a time stamp on a common time axis during logging is given to the information related to the secure communication logged by the first logging unit and the information related to the control of the logging operation logged by the second logging unit.

According to the above disclosure, even when the information related to the secure communication and the information related to the control of the logging operation are logged by different logging units, the information related to the secure communication and the information related to the control of the logging operation can be associated with each other by the time stamp on a common time axis.

According to an example of the present disclosure, a logging method executed by a control device of factory automation (FA) is provided. The control device includes: a first connector that connects a first network to which a control target belongs, a second connector that connects a second network to which an external instrument belongs; a control arithmetic unit that executes control arithmetic processing using data related to the control target; and a communication unit that exchanges the data with the external instrument by secure communication through the second network. The logging method includes, logging information related to the secure communication performed by the communication unit; and logging information related to control of a logging operation of the information related to the secure communication.

By performing the method according to this disclosure, the logging of the information related to the secure communication between the control device and the external instrument that are connected to the network and the logging of the information related to the control of the logging operation can be performed.

In another example of this disclosure, a non-transitory computer-readable recording medium storing a program causing a computer to execute a logging method executed by a control device of factory automation (FA) is provided. The control device includes: a first connector that connects a first network to which a control target belongs; a second connector that connects a second network to which an external instrument belongs; a control arithmetic unit that executes control arithmetic processing using data related to the control target; and a communication unit that exchanges the data with the external instrument by secure communication through the second network. The logging method includes: logging information related to the secure communication performed by the communication unit; and logging information related to control of a logging operation of the information related to the secure communication.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a view illustrating a list of secure communication logs 151 of the embodiment.

FIG. 9 is a view illustrating a list of event logs 152 of the embodiment.

FIG. 10 is a view illustrating an example of a setting related to the secure communication log 151 of the embodiment.

FIG. 12 is a view schematically illustrating an example of a recording system of the event logs 152 of the embodiment.

FIG. 15 is a view illustrating an example of information obtained by monitoring in the secure communication of the embodiment.

DESCRIPTION OF THE PREFERRED EMBODIMENTS

Figure 1:
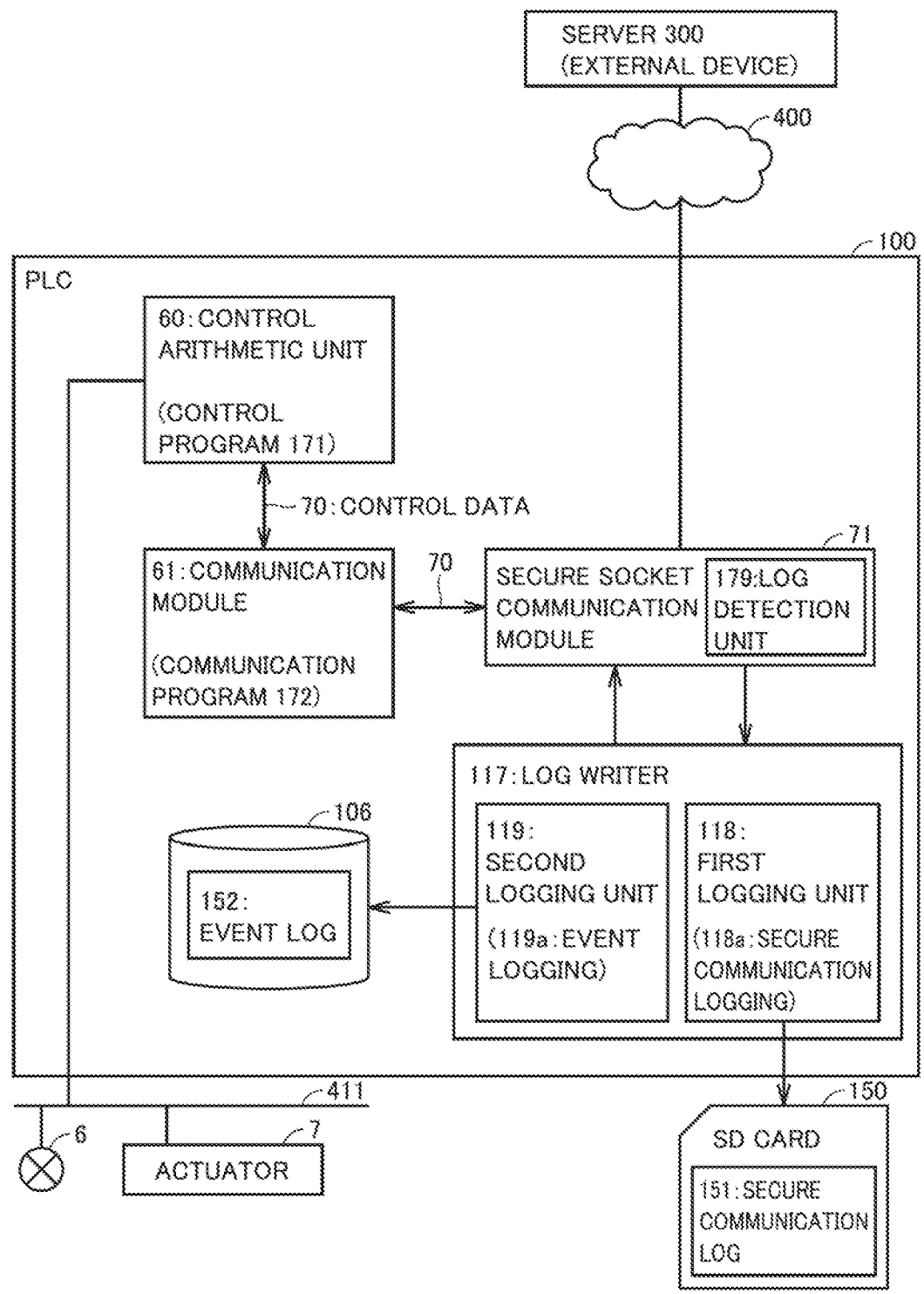
FIG. 1 is a view schematically illustrating a configuration of secure communication and logging in a control device according to an embodiment.

With reference to the drawings, an embodiment will be described in detail. The same or equivalent portion in the drawings is denoted by the same reference numeral, and the description will not be repeated.

A. Application Example

With reference to FIG. 1, an example of a scene to which the present invention is applied will be described. FIG. 1 is a view schematically illustrating a configuration of secure communication and logging in a control device of the embodiment. In the embodiment, "secure communication" indicates secure socket communication using what is called socket communication implemented by executing a socket (a function or a program).

In the embodiment, the control device is an industrial controller such as a programmable logic controller (PLC). In the following description, the PLC applicable to the FA will be described as a specific example as a typical example of the "control device", and the technical idea disclosed in the present specification is applicable to any control device without being limited to the PLC With reference to FIG. 1, a PLC 100 communicates with one or a plurality of field instruments as an arbitrary control target (for example, the target such as the production facility of FA and the instrument) through a field network 411 such as Ethernet/IP (registered trademark). Each of one or the plurality of field instruments includes an actuator 7 that gives some physical action to a production line including a production process (hereinafter, also collectively referred to as a "field") an input and output device 6 including a sensor that exchanges information with the field. Furthermore, the field instrument may include a robot controller that controls an industrial robot.

PLC 100 communicates with an external instrument through a network 400. The external instrument includes a cloud-based external server 300 or an on-premises server 310 described later. The external instrument may include another PLC 100.

PLC 100 includes a control arithmetic unit 60 that executes control arithmetic processing for controlling the target using control data 70 related to control, a communication module 61 and a secure socket communication module 71 that exchange the control data 70 with the external instrument by the secure communication through the network 400, and a log writer 117 provided in association with the secure socket communication module 71. Each unit can be configured by a program module implemented by PLC 100 executing a program, a hardware circuit module, or a combination of the program module and the hardware circuit module.

More specifically, control arithmetic unit 60, communication module 61, and secure socket communication module 71 are implemented by executing a control program 171, a communication program 172, and a secure socket communication program, respectively. In the embodiment, the secure socket communication program of secure socket communication module 71 is implemented by combining a transmission control protocol (TCP) socket and a secure sockets layer (OpenSSL) program. When the secure socket communication program is executed, secure socket communication module 71 performs TCP/IP (Internet protocol) socket communication between PLC 100 and the external instrument, and performs encrypted communication using the OpenSSL in the socket communication. Secure socket communication module 71 implements the encrypted communication by calling (executing) various functions for communication conforming to an SSL protocol and a transport layer security (TLS) protocol from a library provided by the OpenSSL. Hereinafter, the function of the library provided by the OpenSSL is also referred to as a "library function".

Secure socket communication module 71 includes a log detection unit 179. Log detection unit 179 detects the predetermined type of information in the secure communication, and outputs the detected information to first logging unit 118 of log writer 117 together with a logging instruction. First logging unit 118 performs secure communication logging 118a that is a processing for storing information in a storage area of an SD card 150 according to the logging instruction from log detection unit 179. Thus, when the secure communication is performed, the information of the predetermined type detected during the secure communication is logged in the storage area of SD card 150, and a secure communication log 151 of SD card 150 configures history information related to the secure communication.

In the embodiment, the predetermined type of information detected by secure socket communication module 71 in the secure communication includes a parameter of a TLS session indicating a network connection condition and a communication error output from the executed library function.

Log detection unit 179 of secure socket communication module 71 detects a predetermined type of event related to control of a logging operation of first logging unit 118, and outputs information about the detected event to a second logging unit 119 of log writer 117 together with the logging instruction. Second logging unit 119 performs event logging 119a, which is a processing for storing information in a storage medium different from SD card 150, for example, the storage area of a nonvolatile memory 106, according to the logging instruction from log detection unit 179. Thus, the information about the predetermined type event detected in association with the operation of the logging processing of first logging unit 118 is logged in the storage area of nonvolatile memory 106 to configure an event log 152. Nonvolatile memory 106 in which event log 152 is stored may also be configured of an external storage medium.

In the embodiment, a general-purpose protocol such as SSI/TLS is used as the secure communication, but the present invention is not limited the general-purpose protocol. For example, a protocol securing arbitrary security mounted on OPC unified architecture (OPC UA) that is a communication standard of industrial IoT may be used.

As described above, when performing the secure communication with the external instrument, PLC 100 performs secure communication logging 118a logging the information related to the secure communication to acquire secure communication log 151, and performs event logging 119a performing the logging of the information about the event detected related to the control of the logging operation to acquire event log 152. Consequently, PLC 100 provides an environment in which the logging of the information related to the secure communication between PLC 100 and the external instrument that are connected to the network and the external instrument and the logging of the information related to the control of the logging operation can be performed.

Health of the secure communication can be evaluated by providing the logging environment when a user analyzes secure communication log 151 of SD card 150. For example, the user can determine the presence or absence of a trouble from an error caused (generated) in the secure communication by analyzing secure communication log 151, and can also obtain information dealing with the trouble by analyzing the error. When free software such as OpenSSL is used for the secure communication, the operation of the library function is not guaranteed, so that the acquisition of secure communication log 151 has technical significance.

In addition, the user can use event log 152 indicating the information related to the control of the logging operation of secure communication log 151 as the information supporting the analysis of secure communication log 151. For example, at the time of the analysis, the user can determine reliability of the logging operation itself performed to acquire secure communication log 151 by tracing a generation status of the event indicated by event log 152.

Hereinafter, a more detailed configuration and processing of PLC 100 of the embodiment will be described as a more specific application example of the present invention.

B. System Configuration

A system including PLC 100 of the embodiment will be described.

Figure 2:
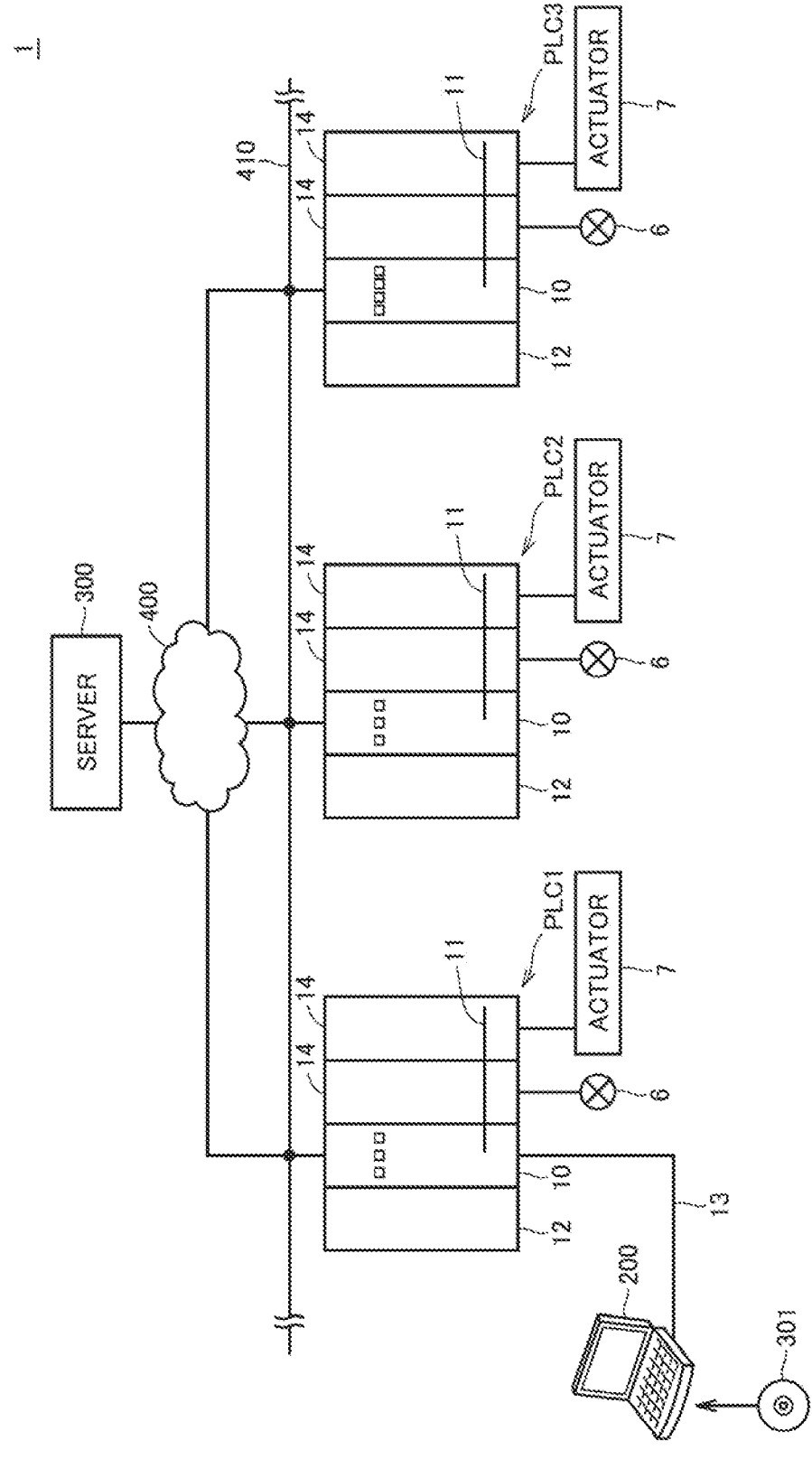
FIG. 2 is a schematic diagram illustrating a system 1 of the embodiment.

FIG. 2 is a schematic diagram illustrating a system 1 of the embodiment. System 1 of the embodiment includes a plurality of PLCs 100 (PLC 1, PLC 2, PLC 3) network-connected through a network 410. The plurality of PLCs communicate with server 300 of the external instrument through a network 400. In FIG. 1, the number of PLCs included in system 1 is three, but is not limited to three as long as the plurality of PLCs are provided.

For example, system 1 in FIG. 2 includes a plurality of types of processes (for example, a screwing process, a soldering process, an assembling process, and the like), and PLC 100 is provided for each of these processes. A workpiece flowing through the production line flows through the process in this order to manufacture a product. In the process, a plurality of types of work are performed on the workpiece by the field instrument. The type and the number of processes included in system 1 are not limited thereto, but can change according to the type of product to be produced or the specification of the product.

System 1 configures a distributed control system in which the PLC is provided for each process. The PLC in each process is connected to networks 400, 401 and exchanges control data 70 related to the control with another PLC.

Each PLC includes a processing unit 10 that is a main body executing various programs, a power supply unit 12 that supplies power to processing unit 10 and the like, and an IO (input/output) unit 14 that exchanges the signal from the field. IO unit 14 is connected to processing unit 10 through a system bus 11. Typically, IO unit 14 acquires an input signal from input and output device 6 that is the field instrument, and drives actuator 7 that is the field instrument according to the execution result of the program in processing unit 10. For example, input and output device 6 detects a control amount of the actuator. Input and output device 6 and actuator 7 configure a device that becomes the "target" controlled by the PLC.

A support device 200 has a function of providing an environment in which an application program to be executed by the PLC is developed, and monitoring an operation state of the connection destination PLC, values of various data, and the like or setting various pieces of information. The developed program or various types of information may be downloaded to PLC 100 through a compact disk-read only memory (CD-ROM) 301 or a universal serial bus (USB) network 13.

C. Hardware Configuration

Figure 3:
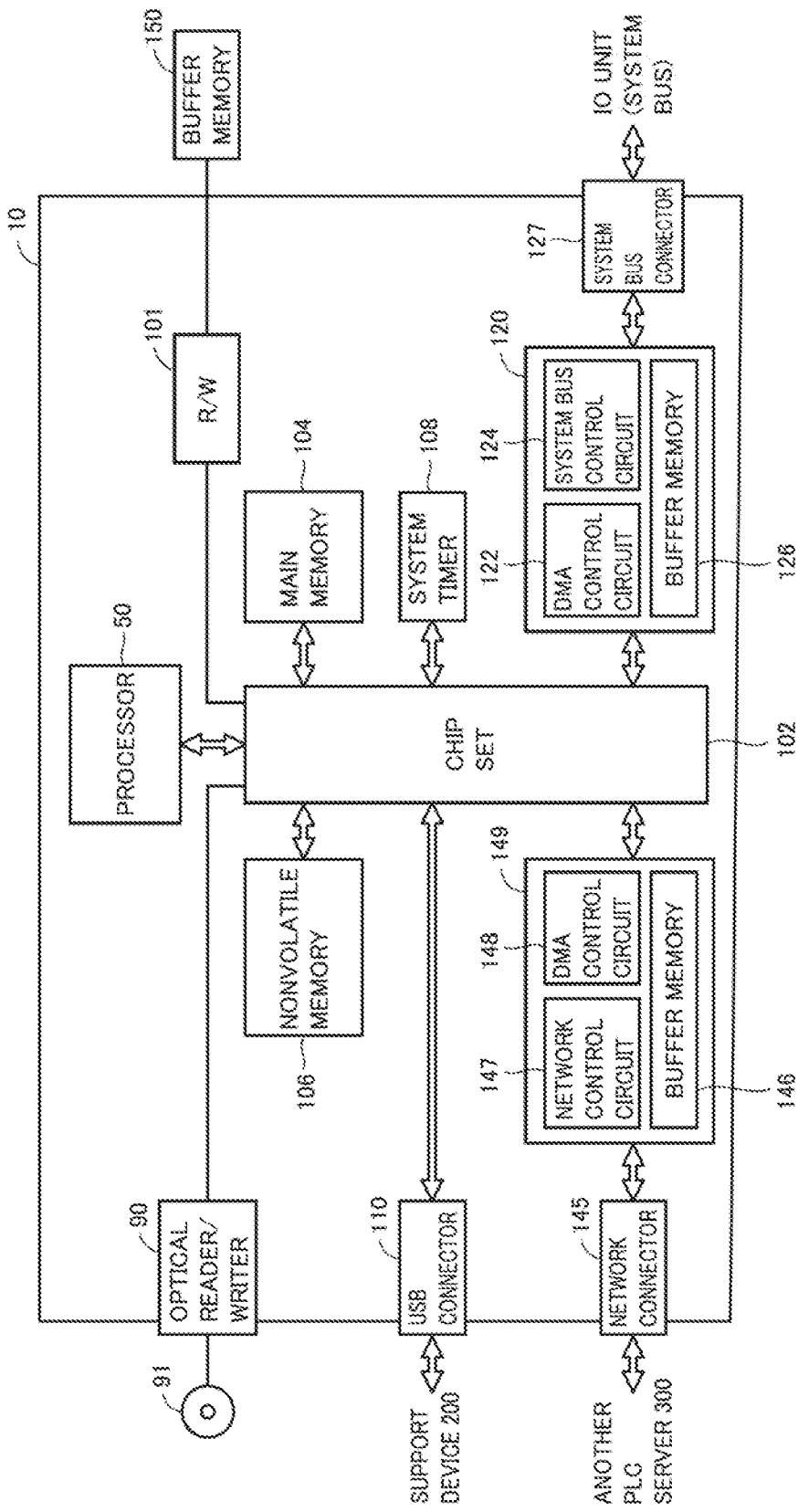
FIG. 3 is a schematic diagram illustrating a hardware configuration of a processing unit 10 of a PLC of the embodiment.

A hardware configuration of the PLC will be described below. FIG. 3 is a schematic diagram illustrating a hardware configuration of processing unit 10 of the PLC of the embodiment. With reference to FIG. 3, processing unit 10 includes a processor 50, a chip set 102, a main memory 104, a nonvolatile memory 106, a system timer 108, an optical reader/writer 90 that reads and writes data of the compact disk-read only memory (CD-ROM) 91, a system bus controller 120, a network connector 145, a network controller 149, a USB connector 110, and a reader/writer (R/W) 101. Chip set 102 and other components are coupled to each other through various buses. R/W 101 configures a storage medium interface circuit to which SD card 150 is detachably attached, and reads and writes the data from and to attached SD card 150.

Processor 50 and chip set 102 are typically configured according to a general purpose computer architecture. That is, processor 50 interprets and executes an instruction code sequentially supplied from chip set 102 according to an internal clock. Chip set 102 exchanges internal data with connected various components and generates the instruction code required for processor 50. Furthermore, chip set 102 has a function of caching data or the like obtained as a result of execution of arithmetic processing in processor 50.

Processing unit 10 includes main memory 104 and nonvolatile memory 106 as memories.

Main memory 104 is a volatile storage area and stores various programs to be executed by processor 50 after processing unit 10 is powered on. Main memory 104 is also used as a working memory when processor 50 executes various programs. A device such as a dynamic random access memory (DRAM), a static random access memory (SRAM), or the like is used as main memory 104.

Nonvolatile memory 106 stores a real-time operating system (OS), a system program, an application program installed from support device 200, and various types of information in a nonvolatile manner.

These programs and data are copied to main memory 104 so as to be accessible by processor 50 as required.

Processing unit 10 includes system bus controller 120 and a network controller 149 as communication interfaces. These communication interfaces transmit output data and receive input data.

System bus controller 120 controls the data exchange through system bus 11. More specifically, system bus controller 120 includes a dynamic memory access (DMA) control circuit 122, a system bus control circuit 124, and a buffer memory 126. System bus controller 120 is internally connected to system bus 11 through a system bus connector 127. System bus connector 127 configures a physical communication port through which PLC 100 connects to field network 411 to which input and output device 6 and actuator 7 such as a drive instrument belong.

Network controller 149 includes a dynamic memory access (DMA) control circuit 148, a network control circuit 147, and a buffer memory 146 in order to control the data exchange between the external instruments (another PLC or servers 300) through network connector 145 and network 410. Network connector 145 configures a physical communication port through which PLC 100 connects the network to which the external instrument belongs.

Network control circuit 147 performs processing for transmitting output data of buffer memory 146 and processing for receiving input data to store the input data in buffer memory 146 with the external instrument connected to network 410.

USB connector 110 is a communication interface connecting support device 200 and processing unit 10. Typically, program which is executable by processor 50 of processing unit 10, various data settings, and the like that are transferred from support device 200 and taken into PLC 100 through USB connector 110.

D. Software Configuration

Subsequently, a software configuration in which the PLC (processing unit 10) provides various functions will be described.

Figure 4:
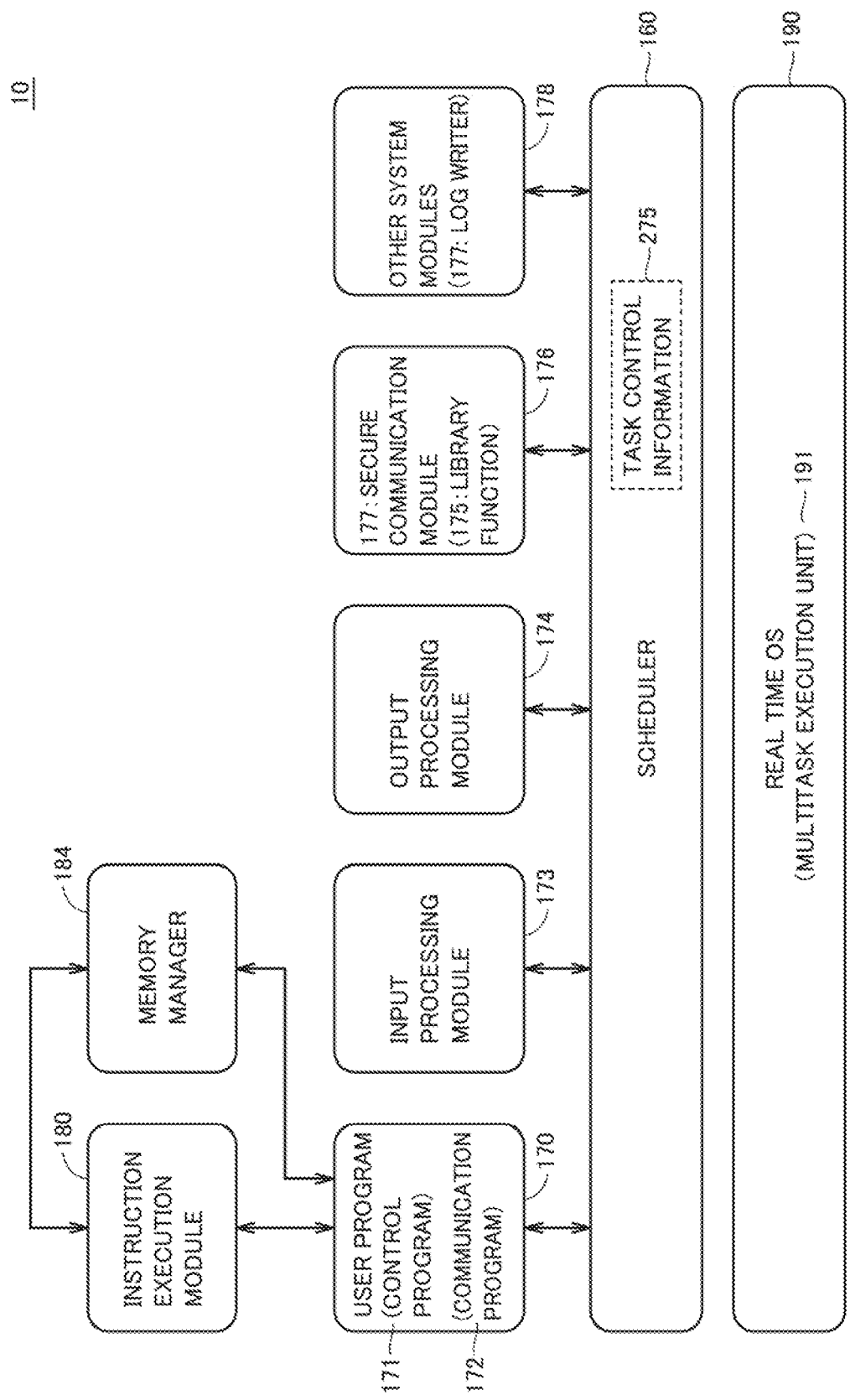
FIG. 4 is a schematic diagram illustrating an example of a software configuration mounted on the processing unit 10 of the PLC of the embodiment.

FIG. 4 is a schematic diagram illustrating an example of the software configuration mounted on processing unit 10 of the PLC of the embodiment. The instruction code included in the software of FIG. 4 is read at appropriate timing, and provided to processor 50 of processing unit 10 and executed by the processor 50.

With reference to FIG. 4, in processing unit 10, a program required for processing in PLC 100 is mounted on a real-time OS 190.

Real-time OS 190 is designed according to a computer architecture of processing unit 10, and provides a basic execution environment in order that processor 50 executes the program required for the processing in PLC 100. More specifically, real-time OS 190 cooperates with a scheduler 160 to implement a multitask execution unit 191. Multitask execution unit 191 provides an environment in which a task implemented by a plurality of programs is executed while switching the task with time. Scheduler 160 switches the task to be allocated to processor 50 according to a priority or cycle of the task indicated by task control information 275. Thus, processor 50 executes the task according to the priority or cycle of the task indicated by the task control information 275.

More specifically, scheduler 160, a user program 170, an input processing module 173, an output processing module 174, a communication processing module 176, another system modules 178 that provide various services, an instruction execution module 180, and a memory manager 184 are implemented in processing unit 10. Memory manager 184 manages the data stored in main memory 104. More specifically, reading and writing by user program 170 are managed, by memory manager 184, for variable data defining various variables used in user program 170 including control program 171 and communication program 172.

Scheduler 160 controls execution start timing and processing interruption according to task control information 275 for user program 170, input processing module 173, output processing module 174, and communication processing module 176 in relation to multitask control.

User program 170 is produced by the user according to a control purpose. That is, the program is arbitrarily designed according to a line (process) and the like of the target controlled using system 1. User program 170 corresponds to an executable formatted program module generated by support device 200, and includes control program 171 and communication program 172. Control program 171 can include a program of various control arithmetic processing such as sequence processing and motion arithmetic calculation.

Communication program 172 communicates with other devices according to, for example, a publishing/subscribing type communication system between external instruments (server 300 or the plurality of PLCs 100) connected to the network. In the embodiment, a message queuing telemetry transport (MQTT) communication protocol that causes server 300 to perform the function of the broker is used as a communication protocol for data distribution that implements the publishing/subscribing communication model. Hereinafter, the publishing/subscribing type communication is abbreviated as Pub/Sub communication. The communication system exchanging the data between the external instruments (server 300 or the plurality of PLCs 100) connected to the network is not limited to the Pub/Sub communication, and the protocol used is not limited to a MQTT communication protocol.

Input processing module 173 rearranges the input data received by system bus controller 120 into a format suitable for the use by user program 170. Output processing module 174 rearranges the output data generated by the execution of user program 170 into a format suitable for transfer to system bus controller 120.

Communication processing module 176 controls communication processing with another PLC by network controller 149 or communication with support device 200. Communication processing with another PLC is implemented in cooperation with the execution of the communication program 172. Communication processing module 176 includes secure socket communication module 71 that utilizes a library function 175.

Another system module 178 collectively indicates one or a plurality of modules implementing various functions of PLC 1. Log writer 117 is provided in system module 178, and treated as a module that cooperates with communication processing module 176.

E. Example of Pub/Sub Communication Model

Figure 5:
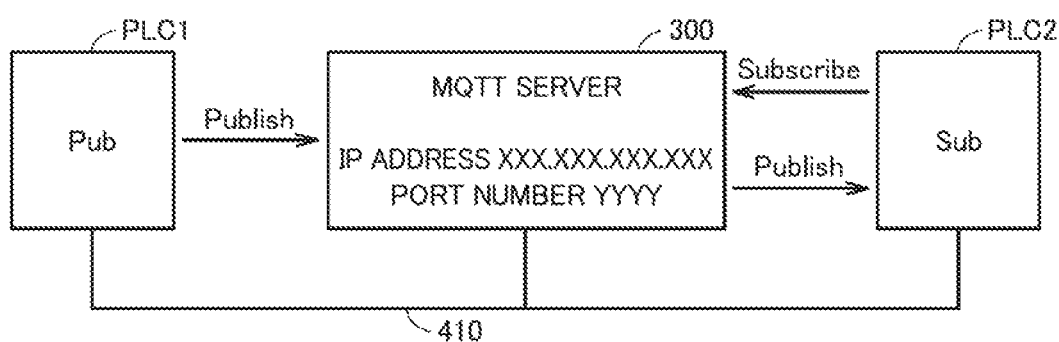
FIG. 5 is a view illustrating a Pub/Sub communication model of the embodiment.

FIG. 5 is a view illustrating a Pub/Sub communication model of the embodiment. With reference to FIG. 5, the Pub/Sub communication model will be described with the connection between PLC 1 and PLC 2 in FIG. 2 as the target. In FIG. 5, the data published by PLC 1 that is a publisher is provided to PLC 2 that is a subscriber through server 300 responsible for message distribution as a MQTT broker. PLC 1 and PLC 2 use an IP address and a port number of MQTT server 300 as parameters of the network connection condition in a TLS session.

The publisher transmits the data with a topic of server 300 as a transmission destination. The publisher defines the topic as the transmission destination of a message format having the data related to the control, and transmits the topic to server 300.

The subscriber applies for the distribution of the topic information to server 300, and receives the distribution of the message registered in the topic for which the distribution is applied from server 300. For example, the subscriber can execute user program 170 including control program 171 using control data 70 transmitted from the publisher.

Server 300 mediates the data exchange between the publisher and the subscriber. The subscriber performs the registration requesting the topic data on server 300. The publisher transmits the message including the topic and the data to server 300.

Server 300 manages the topic to which the subscriber applies for the distribution. For example, when receiving the message including the topic and data from the publisher, server 300 stores the message of the topic and distributes the data of the topic to the subscriber that requests the data of the topic.

The description of FIG. 5 can also be applied to the case where the data published by PLC 2 is provided to PLC 1 that is the subscriber through server 300.

F. Module Configuration of PLC Associated with Peripheral Device

Figure 6:
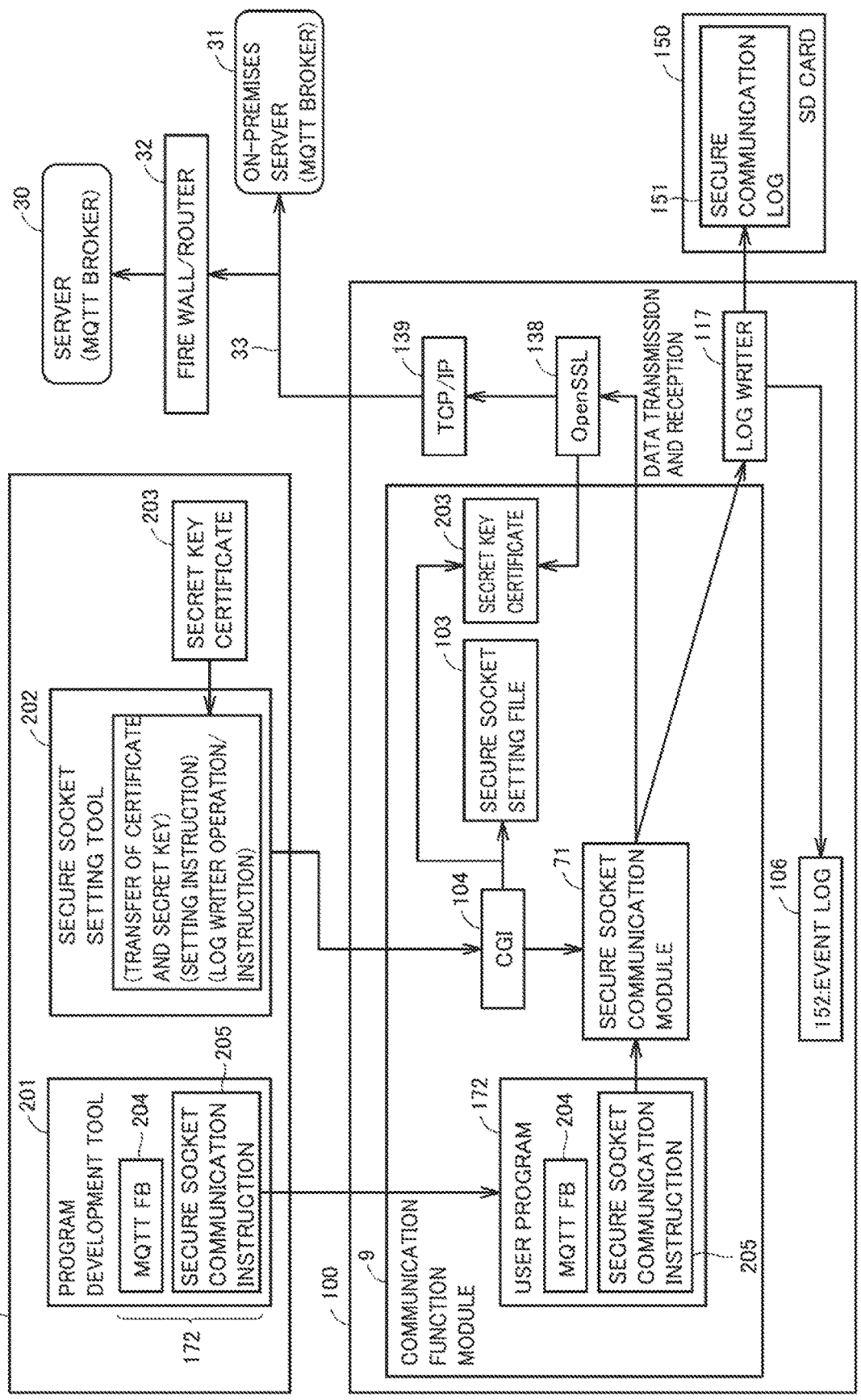
FIG. 6 is a view illustrating a module configuration of the PLC of the embodiment in association with a peripheral device.

FIG. 6 is a view illustrating a module configuration of the PLC of the embodiment in association with a peripheral device. With reference to FIG. 6, communication function module 9 included in PLC 100 is configured of the module and data with which PLC 100 communicates with server 300 configuring the MQTT broker. The module and data of communication function module 9 include executable format communication program 172 and secure socket communication module 71 that are developed (generated) by a program development tool 201 included in support device 200, a common gateway interface (CGI) 104 that accepts a request from support device 200, a secure socket setting file 103, a private key and a certificate 203. In relation to communication function module 9. PLC 100 includes log writer 117, an OpenSSL module 138, and a TCP/IP module 139. For example, secure socket setting rile 103, and the private key and certificate 203 are stored in a nonvolatile storage area of PLC 100.

The user operates program development tool 201 of support device 200, generates communication program 172, and transfers communication program 172 to PLC 100. Communication program 172 includes an MQTT-FB204 and a secure socket communication instruction 205. MQTT-FB204 includes a plurality of function blocks (FBs) implementing the Pub/Sub communication according to the MQTT communication protocol. The FB is a unit program configuring communication program 172, and for example, includes a function having an input parameter and an output parameter. When PLC 100 executes communication program 172, secure socket communication instruction 205 is called and executed based on the output from the FB of the publisher or the subscriber of MQTT-FB204. When secure socket communication instruction 205 is executed, the secure communication is performed using secure socket communication module 71.

The user operates secure socket setting tool 202 of support device 200. Support device 200, from the user's operation, receives a transfer setting instruction transferring and setting private key and certificate 203 to PLC 100 for the secure communication, and receives operation instructions of secure socket communication module 71 and log writer 117. CGI 104 receives the transfer setting instruction and the operation instruction that are transferred from secure socket setting tool 202 of support device 200, stores the setting related to the secure socket communication of secure socket setting file 103 according to the received instruction, and sets the private key and certificate 203 to PLC 100. In addition, CGI 102 activates (or stops) secure socket communication module 71 according to the operation instruction, and sets a log instruction based on the operation instruction of log writer 117 to secure socket communication module 71. For example, the log instruction includes a start instruction causing log writer 117 to start the execution of the logging or a stop instruction stopping the currently-executed logging. Log writer 117 (more specifically, first logging unit 118) activates or stops the logging operation in response to the instruction from secure socket communication module 71.

The data (including control data 70) output from communication program 172 is exchanged with the external instrument through secure socket communication module 71. More specifically, the data output from communication program 172 is output to OpenSSL module 138 through secure socket communication module 71. OpenSSL module 138 performs the encrypted communication using the private keys and certificates 203 through TCP/IP module 139. Encrypted data 33 is transferred to server 300 through a firewall/router 32. Encrypted data 33 may be transferred to on-premises server 310 as the MQTT broker.

When PLC 100 exchanges encrypted data 33 with the external instrument such as server 300 or on-premises server 310, log detection unit 179 of secure socket communication module 71 monitors information output by the library function of OpenSSL module 138, detects the predetermined type of information indicated by secure socket setting file 103 from the monitored information, and outputs information about the secure communication log based on the detected information to log writer 117 together with the logging instruction. First logging unit 118 of log writer 117 performs processing of secure communication logging 118a in order to store the information from log detection unit 179 in SD card 150 according to the logging instruction. In addition, log detection unit 179 of secure socket communication module 71 monitors the event related to the control of the logging operation of first logging unit 118, detects the generation of a predetermined type of event indicated by secure socket setting file 103 from among the monitored events, and outputs the information about the detected event log to log writer 117 together with the logging instruction. Second logging unit 119 of log writer 117 performs the processing of event logging 119a for storing event log 152 in nonvolatile memory 106 according to the logging instruction from log detection unit 179. The user can set the predetermined type of information or event to secure socket setting file 103 of PLC 100 through secure socket setting tool 202 or CGI 104.

G. Secure Communication Sequence

Figure 7:
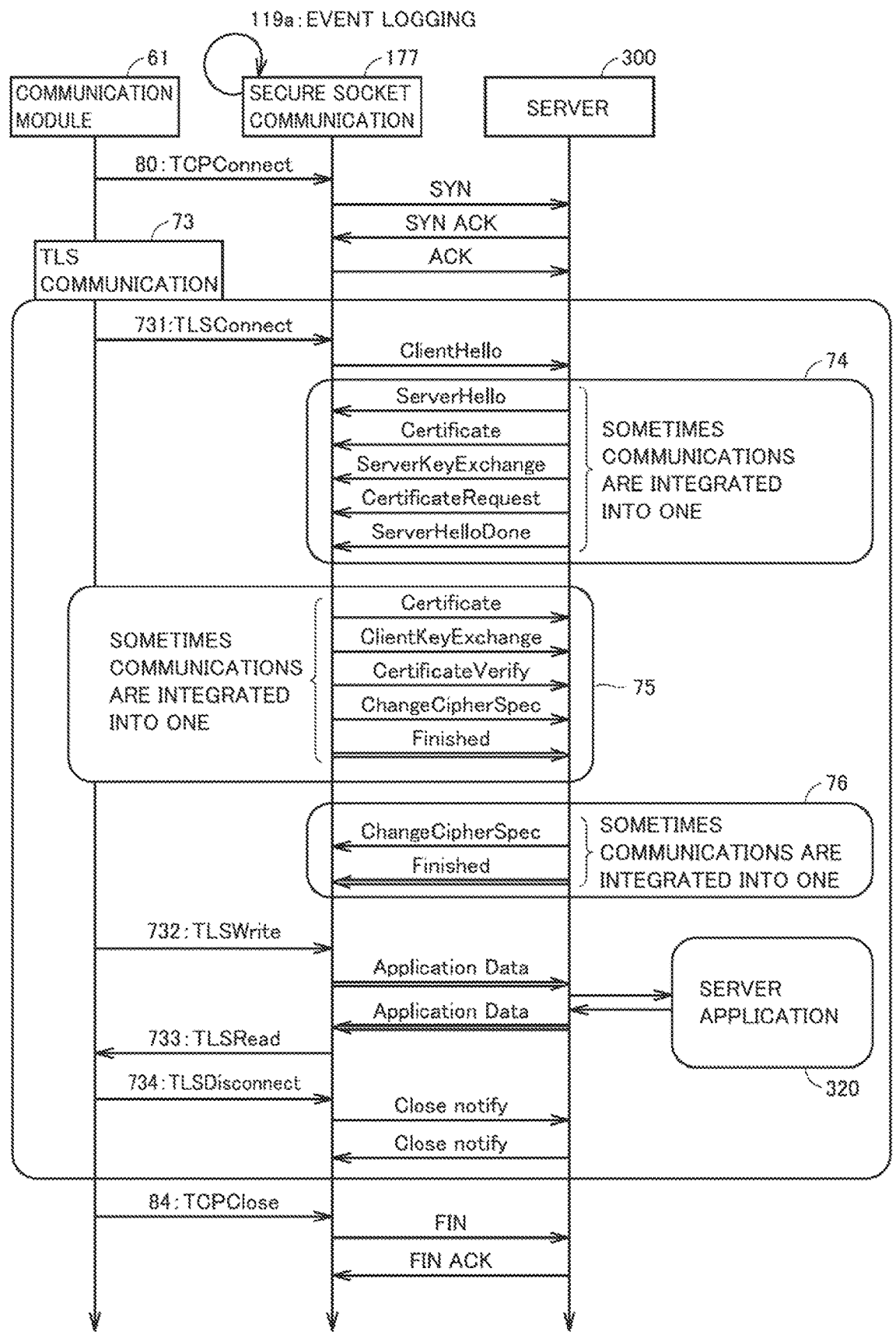
FIG. 7 is a view schematically illustrating a communication sequence of the embodiment.

With reference to FIG. 7, a communication sequence of the secure communication will be described FIG. 7 is a view schematically illustrating the communication sequence of the embodiment. FIG. 7 illustrates the communication sequence of the secure communication among communication module 61, secure socket communication module 71, and server 300 that are configured of communication program 172. In FIG. 7, a double-line arrow indicates the encrypted communication. Secure socket communication module 71 causes log writer 117 to perform the processing of event logging 119a together with the processing in FIG. 7.

With reference to FIG. 7, PLC 100 executes a communication establishment instruction 80 (TCPConnect) included in secure socket communication instruction 205, generates a TCP socket by open processing through secure socket communication module 71, then executes a communication end instruction 84 (TCPClose) included in secure socket communication instruction 205, and closes the TCP socket through secure socket communication module 71. TLS communication 73 is performed until instruction 84 (TCPClose) is executed since instruction 80 (TCPConnect) is executed to generate the TCP socket.

In TLS communication 73, PLC 100 executes an instruction 731 (TLSConnect) establishing the TLS session included in secure socket communication instruction 205, and establishes a secure session using the socket generated in instruction 80 (TCPConnect) and a session ID as arguments.

Communication 74, 75, and 76 exchanging the key and certificate between PLC 100 and server 300 to authenticate the key and certificate each other using the opened secure session, and the communication of the encrypted data between communication module 61 of PLC 100 and server application 320 of server 300 through secure socket communication module 71 are performed after the authentication is performed.

In the communication of the encrypted data, PLC 100 executes a data transmission instruction 732 (TLSWrite) and a data reception instruction 733 (TLSRead) that are included in secure socket communication instruction 205 to communicate with server 300. When the completion of such data communication is ended, PLC 100 executes a session end instruction 734 (TLSDisconnect) included in secure socket communication instruction 205. Thus, the TLS session ends, and then PLC 100 executes instruction 84 (TCPClose) to close the TCP socket.

H. List of Secure Communication Log

FIG. 8 is a view illustrating a list of secure communication logs 151 of the embodiment. Secure communication log 151 includes a category 801 of the log, a log code 802 and a log name 803 that identify the log, a description 804 of the log, and detailed information 805 of the log.

Category 801 includes a category 800 representing the network connection condition (in the FIG. 8, indicated by INFO) of the TLS session and an error (in FIG. 8, indicated by ERROR) 810 in the secure communication of the TLS session.

In relation to the connection condition indicated by the log corresponding to category 800, the log with log code 802 of "1000" includes a host name, an IP address, and the port number of connection destination server 300. The IP address and the port number are associated with server 300 as illustrated in FIG. 5, and secure socket communication module 71 acquires the IP address and the port number from, for example, secure socket setting file 103 or the communication of server 300 during the establishment of the TLS session.

The logs of which log code 802 is "1001", "1002", and "1003" indicates a file name of the certificate of server 300, a file name of a client (PLC 100) certificate, and a file name of a client (PLC 100) private key, respectively. These are obtained when secure socket communication module 71 exchanges the key and certificate with server 300. "1010" and "1011" of log code 802 indicate the logs indicating the establishment and the end of the TLS session, respectively, namely, the logs indicating that secure socket communication module 71 establishes or ends the TLS session.

The Log code 802 after the number of "5000" is assigned to category 810 in which the error output from the OpenSSL library function is classified. The log in which log code 802 indicates "000" indicates a library function name outputting a TLS session error and an error code output by the library function. The log in which log code 802 indicates "500" indicates an error of timeout in the secure communication. The log in which log code 802 indicates "5002" indicates information about the error caused in the secure socket setting file, and for example, indicates a file name and a line number of the secure socket setting file. The log in which log code 802 indicates "5101" indicates information about the error caused in the secure socket setting file, and for example, indicates a section, an entry, a setting value, and the like in which the error is detected.

I. List of Event Logs

FIG. 9 is a view illustrating a list of event logs 152 of the embodiment With reference to FIG. 9, event log 152 is indicated by a number 130 of No. 1, No. 2, No. 3. Event log 152 includes pieces of information of an event type 131 identifying the log, an item 132 to be recorded for the event, an event category 133, an event code 134, an importance level 135, and an importance level change 136.

Event category 133 includes "system" and "access". Event type 131 corresponding to the log in which event category 133 is "system" includes an event of the start (start of recording) or the stop (stop of recording) of the logging operation of secure communication log 151 by first logging unit 118 of log writer 117 and a failure of the logging (recoding) operation of secure communication log 151. For example, the failure of the recording operation of secure communication log 151 indicates that SD card 150, which is a medium in which secure communication log 151 is stored, is not attached to PLC 100, but is not limited thereto.

PLC 100 can detect whether SD card 150 is attached to or not attached to R/W 101 based on the output from R/W 101. For example, when the event in which SD card 150 is not attached is detected, secure socket communication module 71 may record secure communication log 151 in nonvolatile memory 106 instead of SD card 150. More specifically, secure socket communication module 71 may control second logging unit 119 of log writer 117 to perform the logging of secure communication log 151. Alternatively, when second logging unit 119 performs the logging operation of secure communication log 151, only secure communication log 151 corresponding to a change point at which the state in which the secure communication log can be recorded in SD card 150 is changed to the state in which secure communication log 151 cannot be recorded may be recorded in nonvolatile memory 106.

Event type 131 corresponding to the log in which event category 133 is "access" includes an event that secure socket setting file 103 is accessed by secure socket setting tool 202.

The type of the access for secure socket setting file 103 includes the access to the setting related to the secure socket communication and the access to the setting related to secure communication log 151. The setting related to the secure socket communication includes the session ID, and the access to the setting includes the reading, change, and deletion of the setting.

The access to the setting related to secure communication log 151 includes the reading and change of the setting FIG. 10 is a view illustrating an example of the setting related to secure communication log 151 of the embodiment. The setting of the secure socket communication log included in secure socket setting file 103 includes an option and a value written (set) to the option. An example of this option-value relationship is illustrated in FIG. 10. With reference to FIG. 10, any one of disable and enable is set as the option. Enable indicates the option of enabling the logging operation of secure communication log 151 of first logging unit 118, and disable indicates the option of disabling the logging operation. In FIG. 10, there are two types of options that can be set to control the logging operation, but the options are not limited to these types.

J. Logging Formats of Communication Log and Event Log

Figure 11:
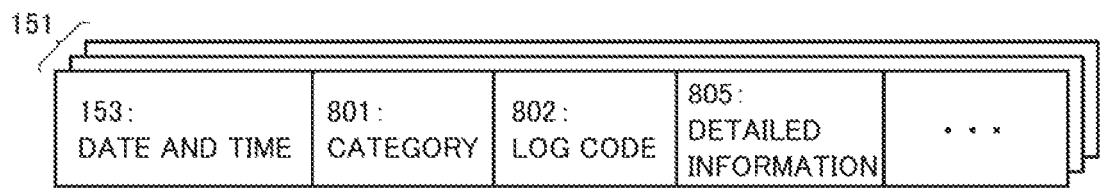
FIG. 11 is a view schematically illustrating an example of a recording system of the secure communication log 151 of the embodiment.

FIG. 11 is a view schematically illustrating an example of a recording system of secure communication log 151 of the embodiment. With reference to FIG. 11, each log of secure communication log 151 is stored in SD card 150 in association with data 153 indicating the date and time when secure socket communication module 71 detects the network connection condition or the error. FIG. 12 is a view schematically illustrating an example of the recording system of event logs 152 of the embodiment. With reference to FIG. 12, the log of the event in FIG. 9 is stored in nonvolatile memory 106 in association with data 154 indicating the date and time when secure socket communication module 71 detects the event. Log detection unit 179 converts the predetermined type of information (including the error) output from the library function into log code 802 according to a rule, and searches the table in FIG. 8 based on converted log code 802. Log detection unit 179 searches the information corresponding to log code 802 from FIG. 8 based on the search result, acquires secure communication log 151 from the searched information, and outputs secure communication log 151 to first logging unit 118 of log writer 117 together with the logging instruction. In addition, log detection unit 179 searches the table in FIG. 9 based on the type (predetermined type) of the event detected in relation to the logging operation of first logging unit 118. Log detection unit 179 searches the table in FIG. 9 for information (item 132 to be recorded, event category 133, event code 134, importance level 135, and importance level change 136) corresponding to event type 131 corresponding to the type of the event based on the search result, and outputs the event log to second logging unit 119 of log writer 117 based on the searched information together with the logging instruction. In the embodiment, the information about the table (table) in FIG. 8 or 9 can be included in secure socket setting file 103 in order to set the logging target information or the event type to PLC 100.

According to the logging format in FIGS. 11 and 12, both secure communication log 151 and event log 152 can be associated with each other using a time stamp based on the time measured by system timer 108, namely, data 153 and 154 of the time stamp on a common time axis. Consequently, when the user analyzes secure communication log 151, event log 152 can be traced based on this association. In the embodiment, support device 200 provides a tool analyzing secure communication log 151 and event log 152. In the embodiment, for example, log detection unit 179 or log writer 117 adds the time stamp to the log.

K. Flowchart of Secure Communication Processing

Figure 13:
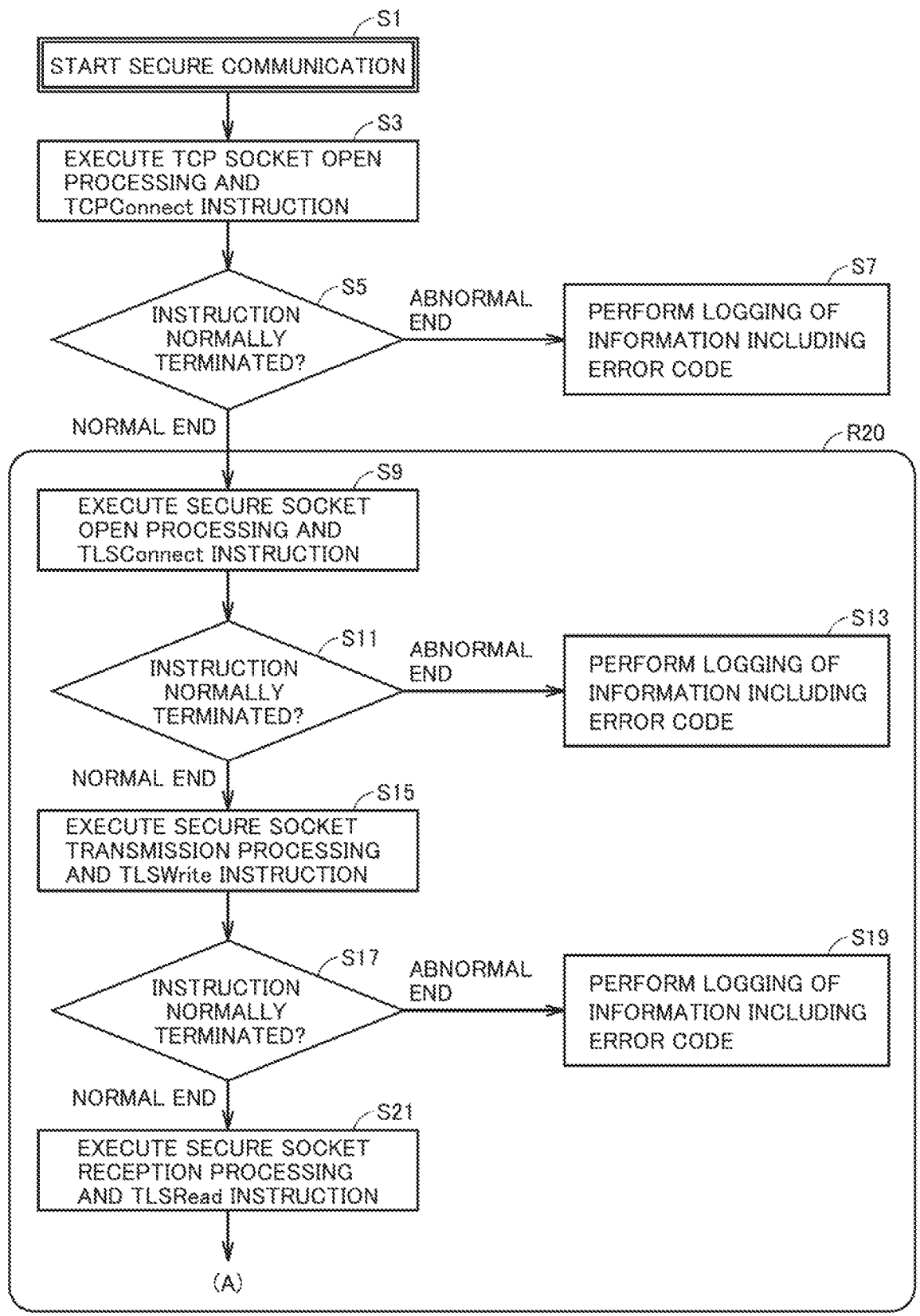
FIG. 13 is a view schematically illustrating an example of the recording system of the event logs 152 of the embodiment.
Figure 14:
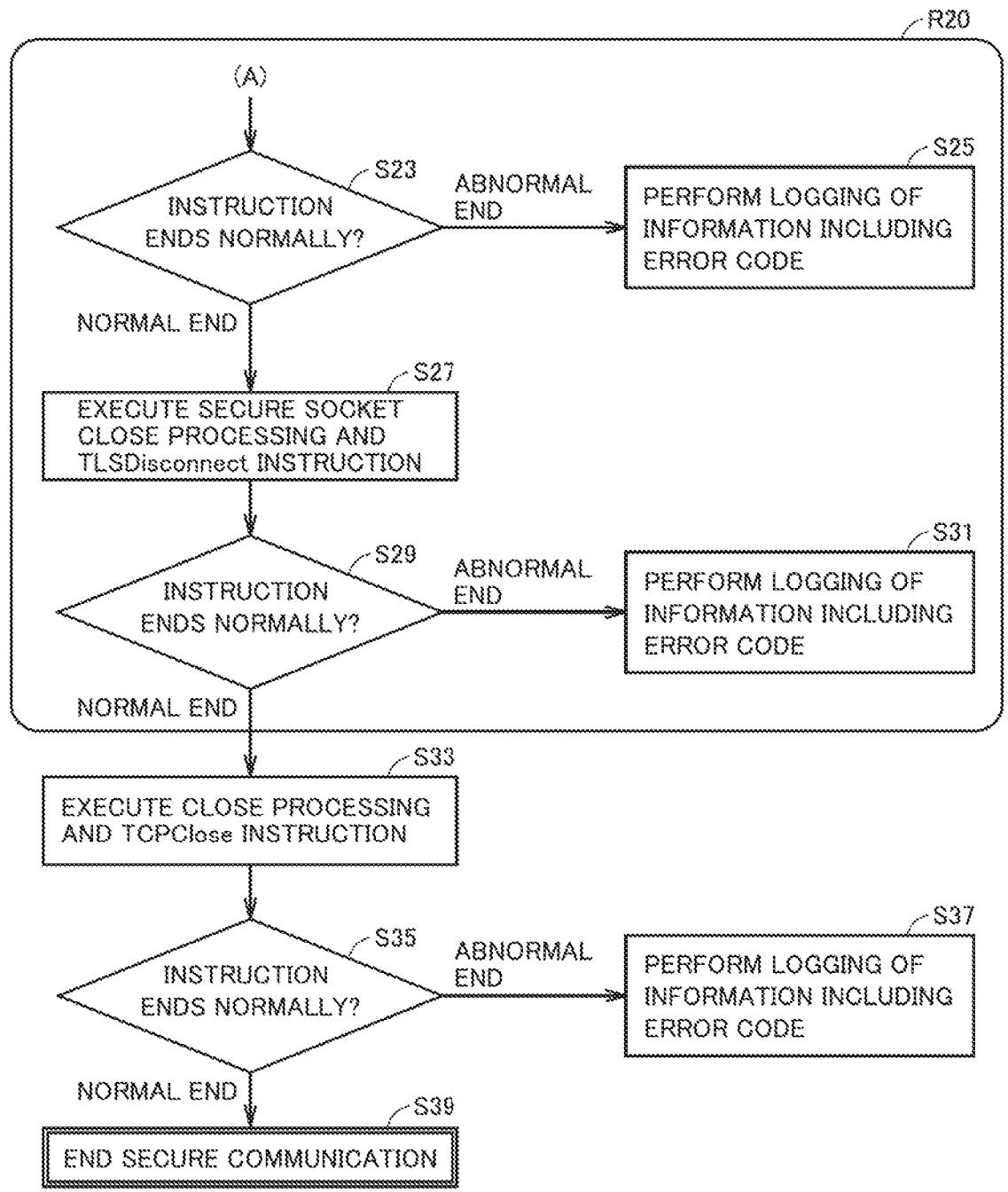
FIG. 14 is a flowchart illustrating secure communication processing of the embodiment.

FIGS. 13 and 14 are a flowchart illustrating secure communication processing of the embodiment. In FIGS. 13 and 14, the processing of communication 74, 75, and 76 for exchanging the key and certificate between PLC 100 and server 300 to authenticate PLC 100 and server 300 each other, which is described in FIG. 7, is omitted.

With reference to FIG. 12, when the secure communication is started (step S1). PLC 100 executes communication establishment instruction 80 (TCPConnect) included in secure socket communication instruction 205 to perform the open processing of the TCP socket (step S3), and PLC 100 as secure socket communication module 71 determines whether instruction 80 is normal or abnormal ended based on the output of the function of the TCP socket indicated by instruction 80 (step S5).

When instruction 80 is determined to be abnormally ended ("abnormal end" in step S5), secure socket communication module 71 stores (logs) the information including the error code indicated by the output of the function of instruction 80 in SD card 150 through log writer 117 as secure communication log 151 (step S7).

On the other hand, when instruction 80 is determined to be normally ended ("normal end" in step S5), PLC 100 executes communication processing R20 of TLS communication 73.

First, in TLS communication 73, PLC 100 executes instruction 731 (TLSConnect) included in secure socket communication instruction 205 to establish the TLS session, and PLC 100 as secure socket communication module 71 determines whether instruction 731 is normally or abnormally ended based on the output of the function of secure socket indicated by the instruction 731 (step S11).

When instruction 731 is determined to be abnormally ended ("abnormal end" in step S11), secure socket communication module 71 generates the information including the error code indicated by the output of the function of instruction 731, and stores (logs) the information in SD card 150 through log writer 117 as secure communication log 151 (step S13).

On the other hand, when instruction 731 is determined to be normally ended ("normal end" in step S11), PLC 100 executes instruction 732 (TLSWrite) of the data transmission processing included in secure socket communication instruction 205 for the data communication (step S15) and executes instruction 733 (TLSRead) of the data reception processing (step S21). PLC 100 as secure socket communication module 71 determines whether instruction 732 is normally or abnormally ended based on the output of the function of the secure socket indicated by instruction 732 (step S17), and determines whether instruction 733 is normally or abnormally ended based on the output of the function of the secure socket indicated by instruction 733 (step S23).

When instruction 732 or instruction 733 is determined to be abnormally ended ("abnormal end" in step S17 or "abnormal end" in step S23), secure socket communication module 71 generates the information including the error code indicated by the output of the function of instruction 732 or instruction 733, and stores (logs) the information in SD card 150 through log writer 117 as secure communication log 151 (step S19, step S25).

When instruction 732 and instruction 733 are determined to be normally ended ("normal end" in step S17 and "normal end" in step S23), PLC 100 executes session end instruction 734 (TLSConnect) included in secure socket communication instruction 205 in order to close the TCP socket (step S27) PLC 100 as the secure socket communication module 71 determines whether instruction 734 is normal or abnormal ended based on the output of the function of secure socket indicated by the instruction 734 (step S29).

When instruction 734 is determined to be abnormally ended ("abnormal end" in step S29), secure socket communication module 71 stores (logs) the information including the error code indicated by the output of the function of instruction 734 in SD card 150 through log writer 117 as secure communication log 151 (step S31).

On the other hand, when instruction 734 is determined to be normally ended ("normal end" in step S29), PLC 100 executes instruction 84 (TCPClose) to close the TCP socket (step S33). PLC 100 as the secure socket communication module 71 determines whether instruction 84 is normally or abnormally ended based on the output of the function of socket indicated by the instruction 84 (step S35).

When the instruction 84 is determined to be abnormally ended ("abnormal end" in step S35), secure socket communication module 71 stores (logs) the information including the error code indicated by the output of the function of instruction 84 in SD card 150 through log writer 117 as secure communication log 151 (step S37).

On the other hand, when instruction 84 is determined to be normally ended, the secure communication in TLS communication 73 is ended (step S39).

In addition to the secure communication processing in FIGS. 13 and 14, PLC 100 as the secure socket communication module 71 monitors whether the event log controlling the logging operation of secure communication log 151 is generated, and stores (logs) event log 152 including the code indicating the event in nonvolatile memory 106 through log writer 117 when occurrence of the event is detected.

The case where TCPConnect of instruction 80 described above outputs the error includes, for example, the case where an Ethernet cable is not connected, the case where a TCP socket is not opened, the case where an IP address of the connection destination is incorrect, the case where a HOST name of the connection destination is incorrect, the case where the port number of the connection destination is incorrect, the case where the IP address setting of PLC 100 is incorrect, and the case where the communication is blocked by a firewall.

Examples of the case where TLSConnect of instruction 731 outputs the error include the case where the certificate or the private key is incorrect, the case where an expiration date of the certificate is expired, and the case where the certificate is lapse.

Examples of the case where TLSWrite or TLSRead of instructions 732 and 733 outputs the error include the case where the secure communication cannot be performed (for example, the session of the cure socket is disconnected, the TCP socket is disconnected, or the like), and the case where authentication of server 300 failed.

According to FIGS. 13 and 14, when communication program 172 and secure socket communication module 71 perform the secure communication, the error is detected, and log writer 117 can perform the logging processing on secure communication log 151 that is the history information related to the secure communication including the detected error Secure socket communication module 71 includes the error information output by the OpenSSL library function in secure communication log 151 during the secure communication. Thus, PLC 100 can provide secure communication log 151 as the information evaluating or analyzing the health of the secure communication.

L. Example of Communication Data

FIG. 15 is a view illustrating an example of the information obtained by the monitoring in the secure communication of the embodiment. With reference to FIG. 15, frame (frame) 9 indicates a TCP connection establishment procedure, frame 13 indicates a TLS session establishment procedure (starting processing of secure communication using OpenSSL), a frame starting from frame 24 indicates data 241 exchanged between PLC 100 and server 300, frame 32 indicates a TLS session termination procedure (terminating processing of secure communication using OpenSSL), and frame 48 indicates a TCP connection termination procedure.

As illustrated in FIG. 15, in the frame starting from frame 24, data 241 exchanged between PLC 100 and server 300 is encrypted. Even when encrypted data 241 is logged, it is difficult to analyze the logged encrypted data. In the embodiment, first logging unit 118 logs the information related to the secure communication except for the data (that is, encrypted data) related to the control exchanged through the secure communication. By not logging encrypted data 241 in this way, the storage area of SD card 150 can be effectively used.

In the embodiment, the information logged by first logging unit 118 may log the information about the frames related to the procedure of the connection establishment and the procedure of the session establishment of the secure communication illustrated in frame 9, frame 13, frame 24, frame 32, and frame 48 in addition to the network connection condition or the error in FIG. 8.

M. Program and Recording Medium

User program 170 including communication program 172 described in the embodiment, the program of secure socket communication module 71, and the program of log writer 117 can be recorded in a computer-readable recording medium including a recording medium such as a flexible disk, CD-ROM 91, a ROM (Read Only Memory), a RAM (Random Access Memory), and an HDD (Hard Disc Drive) that are attached to PLC 100, and can be provided as a program product. The recording medium is a medium that accumulates information such as the program by electrical, magnetic, optical, mechanical, or chemical action such that a computer, other devices, a machine, or the like can read the information such as the recorded program.

The program can be provided to PLC 100 by being downloaded from the network through the communication interface.

Although the embodiment of the present invention has been described, it should be considered that the disclosed embodiment is an example in all respects and not restrictive. The scope of the present invention is indicated by the claims, and it is intended that all modifications within the meaning and scope of the claims and equivalents are included in the present invention.

What is claimed is:

1. A control device for factory automation (FA), the control device comprising:
   a first connector to connect a first network to which a control target belongs;
   a second connector to connect a second network to which an external instrument belongs; and
   hardware circuit and/or at least one processor configured to implement:
      a control arithmetic unit to execute control arithmetic processing using data related to the control target;
      a communication unit to exchange the data with the external instrument by secure communication through the second network;
      a first logging unit to log information related to the secure communication performed by the communication unit; and
      a second logging unit to log information related to control of a logging operation of the first logging unit,
   wherein the control device further comprises a storage medium interface to which an external storage medium is detachably attached, and
   wherein the first logging unit stores the information related to the secure communication in the external storage medium attached to the storage medium interface.

2. The control device according to claim 1, wherein the second logging unit stores the information related to the control of the logging operation in a storage medium different from the external storage medium.

3. A control device for factory automation (FA), the control device comprising:
   a first connector to connect a first network to which a control target belongs;
   a second connector to connect a second network to which an external instrument belongs; and
   hardware circuit and/or at least one processor configured to implement:
      a control arithmetic unit to execute control arithmetic processing using data related to the control target;
      a communication unit to exchange the data with the external instrument by secure communication through the second network;
      a first logging unit to log information related to the secure communication performed by the communication unit; and
   a second logging unit to log information related to control of a logging operation of the first logging unit,
   wherein the first logging unit logs the information related to the secure communication except for the data related to the control exchanged in the secure communication.

4. A control device for factory automation (FA), the control device comprising:

a first connector to connect a first network to which a control target belongs;
a second connector to connect a second network to which an external instrument belongs; and
hardware circuit and/or at least one processor configured to implement:
a control arithmetic unit to execute control arithmetic processing using data related to the control target;
a communication unit to exchange the data with the external instrument by secure communication through the second network;
a first logging unit to log information related to the secure communication performed by the communication unit; and
a second logging unit to log information related to control of a logging operation of the first logging unit,
wherein the information related to the secure communication includes information about an error caused in the secure communication.

5. A control device for factory automation (FA), the control device comprising:
a first connector to connect a first network to which a control target belongs;
a second connector to connect a second network to which an external instrument belongs; and
hardware circuit and/or at least one processor configured to implement:
a control arithmetic unit to execute control arithmetic processing using data related to the control target;
a communication unit to exchange the data with the external instrument by secure communication through the second network;
a first logging unit to log information related to the secure communication performed by the communication unit; and
a second logging unit to log information related to control of a logging operation of the first logging unit,
wherein the information related to the secure communication includes a condition establishing the secure communication through the second network.

6. A control device for factory automation (FA), the control device comprising:
a first connector to connect a first network to which a control target belongs;
a second connector to connect a second network to which an external instrument belongs; and
hardware circuit and/or at least one processor configured to implement:
a control arithmetic unit to execute control arithmetic processing using data related to the control target;
a communication unit to exchange the data with the external instrument by secure communication through the second network;
a first logging unit to log information related to the secure communication performed by the communication unit; and
a second logging unit to log information related to control of a logging operation of the first logging unit,
wherein the information related to the secure communication includes information related to connection establishment of the secure communication through the second network.

7. The control device according to claim 6, wherein the information related to the secure communication includes information related to session establishment after the connection establishment.

8. A control device for factory automation (FA), the control device comprising:
a first connector to connect a first network to which a control target belongs;
a second connector to connect a second network to which an external instrument belongs; and
hardware circuit and/or at least one processor configured to implement;
a control arithmetic unit to execute control arithmetic processing using data related to the control target;
a communication unit to exchange the data with the external instrument by secure communication through the second network;
a first logging unit to log information related to the secure communication performed by the communication unit; and
a second logging unit to log information related to control of a logging operation of the first logging unit,
wherein the information related to the control of the logging operation includes at least one of a start of the logging operation, a stop of the logging operation, a failure of the logging operation, and a setting related to the logging operation.

9. The control device according to claim 8, wherein the setting related to the logging operation includes a setting enabling or disabling the logging operation.

10. A control device for factory automation (FA), the control device comprising:
a first connector to connect a first network to which a control target belongs;
a second connector to connect a second network to which an external instrument belongs; and
hardware circuit and/or at least one processor configured to implement:
a control arithmetic unit to execute control arithmetic processing using data related to the control target;
a communication unit to exchange the data with the external instrument by secure communication through the second network;
a first logging unit to log information related to the secure communication performed by the communication unit; and
a second logging unit to log information related to control of a logging operation of the first logging unit,
wherein a time stamp on a common time axis during logging is given to the information related to the secure communication logged by the first logging unit and the information related to the control of the logging operation logged by the second logging unit.

11. A logging method executed by a control device of factory automation (FA), the control device including:
a storage medium interface to which an external storage medium is detachably attached;
a first connector to connect a first network to which a control target belongs;
a second connector to connect a second network to which an external instrument belongs; and
hardware circuit and/or at least one processor configured to implement:
a control arithmetic unit to execute control arithmetic processing using data related to the control target; and
a communication unit to exchange the data with the external instrument by secure communication through the second network,
wherein the logging method comprises:

logging information related to the secure communication performed by the communication unit; and logging information related to control of a logging operation of the information related to the secure communication, and wherein logging the information related to the secure communication includes storing the information related to the secure communication in the external storage medium attached to the storage medium interface.

12. A non-transitory computer-readable recording medium storing a program which, when executed by a control device of factory automation (FA), causes the control device to execute a logging method, wherein the control device includes:

a storage medium interface to which an external storage medium is detachably attached;

a first connector that connects a first network to which a control target belongs;

a second connector that connects a second network to which an external instrument belongs; and hardware circuit and/or at least one processor configured to implement:

a control arithmetic unit that executes control arithmetic processing using data related to the control of the target; and a communication unit that exchanges the data with the external instrument by secure communication via the second network, wherein the logging method includes:

logging information related to the secure communication performed by the communication unit; and logging information related to control of a logging operation of the information related to the secure communication, and wherein logging the information related to the secure communication includes storing the information related to the secure communication in the external storage medium attached to the storage medium interface.

\* \* \* \* \*